United States Patent

Massey et al.

[11] Patent Number: 5,866,647
[45] Date of Patent: Feb. 2, 1999

[54] POLYMERIC BASED COMPOSITE BEARING

[75] Inventors: Douglas Von Massey, Norman; Mickey L. Love, Oklahoma City, both of Okla.

[73] Assignee: Dana Corporation, Toledo, Ohio

[21] Appl. No.: 579,036

[22] Filed: Dec. 19, 1995

Related U.S. Application Data

[63] Continuation of Ser. No. 227,948, Apr. 15, 1994, abandoned.
[51] Int. Cl.⁶ ............................... C08L 77/00; C08K 3/40
[52] U.S. Cl. ...................... 524/494; 524/538; 524/539; 524/540; 252/12.4; 252/12.6
[58] Field of Search .......................... 252/12.6; 524/494, 524/538

[56] References Cited

U.S. PATENT DOCUMENTS

| | | | |
|---|---|---|---|
| 3,130,976 | 4/1964 | Niswander | 277/188 |
| 3,230,184 | 1/1966 | Alford | 524/494 |
| 3,929,396 | 12/1975 | Orkin et al. | 308/241 |
| 4,308,321 | 12/1981 | Hodes et al. | 428/612 |
| 4,532,054 | 7/1985 | Johnson | 252/12.4 |
| 4,582,368 | 4/1986 | Fujita et al. | 308/5 R |
| 4,847,135 | 7/1989 | Braus et al. | 428/138 |
| 5,180,231 | 1/1993 | Ueno et al. | 384/527 |
| 5,236,784 | 8/1993 | Kobayahi et al. | 428/408 |
| 5,278,205 | 1/1994 | Siddiqui | 523/219 |
| 5,278,230 | 1/1994 | Bell | 525/66 |
| 5,304,422 | 4/1994 | Tanabe et al. | 428/392 |

OTHER PUBLICATIONS

Publication entitled "Spheriglass Solid Glass Spheres", published by Potters Industries Inc., dated Jun. 1992.
Publication entitled "How Short Aramid Fiber Improves Wear Resistance", by Y.T. Wu.
Publication entitled "Spheriglass Solid Glass Spheres For Use in Plastics", published by Potters Industries Inc.

*Primary Examiner*—Ana Woodward
*Attorney, Agent, or Firm*—Rader, Fishman & Grauer PLLC

[57] ABSTRACT

A polymeric based composite bearing is injected molded of a thermoplastic material reinforced with a high strength fiber and reinforcing beads. Typically, the high strength fiber is selected from the group consisting of aromatic polyamide fiber, high strength/high purity glass fiber, carbon fiber, boron fiber, and metallic fibers. The reinforcing spheres are selected from the group consisting of glass beads, boron nitride beads, silicon carbide beads and silicon nitride beads. The thermoplastic matrix material may consist of polyamide, polyacetal, polyphenylene sulfide, polyester and polyimide. Preferably, the composite bearing comprises between about 5 to about 35 percent weight of the high strength fiber, between about 5 to about 15 percent weight percent of the reinforcing spheres, and between about 50 to about 90 weight percent of the thermoplastic matrix material. The bearing may be injection molded by blending the composite material, heating the composite material to a temperature above its melting temperature, injecting the composite material into a mold cavity, and demolding the bearing after the temperature of the bearing drops substantially below the melting temperature.

5 Claims, 1 Drawing Sheet

POLYMERIC BASED COMPOSITE BEARING

This application is a continuation of copending application(s) Ser. No. 08/227,948 filed on Apr. 15, 1994, now abandoned.

FIELD OF THE INVENTION

The present invention generally relates to a polymeric based, injected molded composite bearing and more specifically to a polymeric based bearing injection molded of a thermoplastic material reinforced with aromatic polyimide fibers and glass beads. The bearing has improved strength and frictional properties.

BACKGROUND OF THE INVENTION

Bearings have been made with polymeric materials. In industrial applications bearings sometimes function in hostile environments of heat and vibration. Suitable bearing materials for use in such hostile environments are restricted to thermoset polymers which must be processed by casting or machining. The use of a casting or machining process is time consuming and can be carried out only at high manufacturing cost. Therefore, the process is not suitable for large volume, low cost industrial applications.

Others have attempted the use of thermoplastic polymeric materials in the making of plastic bearings. The heat generated in the operation of a bearing causes many problems for a thermoplastic bearing, including thermal distortion and loss of dimensions. To solve these problems, others have designed plastic bearings with a molded-in metal structural enforcement. For example, one known bearing includes a polymeric matrix material used as a coating on a steel mesh frame. The steel mesh frame provides the structural integrity of the bearing while the polymeric matrix material provides the desirable frictional properties of the sliding surface. Unfortunately, the method required to produce such a bearing is labor intensive and requires complicated processing steps. Therefore, it is not suitable for low cost, high volume industrial applications.

In view of the shortcomings of the prior art, it is desirable to provide a polymeric based composite bearing that can be injection molded of a thermoplastic material, with improved strength and frictional properties, and that can be produced in a low cost, high volume industrial process. It is also desirable that such a bearing be injection molded of a homogeneous material and not require a metal enforcement for structural support.

SUMMARY OF THE INVENTION

In accordance with the present invention, a novel polymeric based composite bearing is disclosed with improved strength and frictional properties that may be injection or compression molded, or extruded.

In a preferred embodiment, the novel polymeric based composite bearing is injection molded of a thermoplastic material reinforced with a high strength fiber and a plurality of glass beads. Preferably, the glass beads are solid and generally spherical. One possible high strength fiber that may be used includes an aromatic polyimide fiber. The polymeric matrix material may be any high strength thermoplastic material. One suitable material is polyamide.

The novel polymeric based composite bearing can be injection molded at a low cost and at a high production rate. The normal composition ranges useful in bearing applications are between about 5 to about 35 weight percent of the high strength fiber, between about 5 to about 15 weight percent of the glass beads, and between about 50 to about 90 weight percent of the thermoplastic matrix material.

The novel polymeric based composite bearing can be molded with a homogeneous composite material alone without any additional reinforcing members molded into the bearing, providing a bearing that can be easily processed at low manufacturing cost.

The present invention is also directed to a novel polymeric based composite material from which a bearing may be injection molded, and a method of injection molding such a novel polymeric based composite material.

BRIEF DESCRIPTION OF THE DRAWING

Other objects, features and advantages of the present invention will become apparent upon consideration of the specification and the appended drawing in which an enlarged partial cross-sectional view of a polymeric based composite bearing is shown.

DETAILED DESCRIPTION OF THE PREFERRED EMBODIMENT

Figure 1:
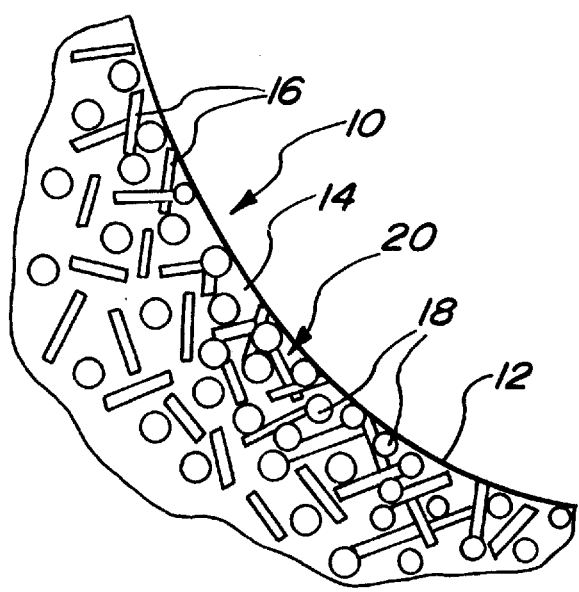

FIG. 1 illustrates an enlarged partial, cross-sectional view of a novel polymeric based composite bearing 10, wherein a smooth bearing surface 12 is formed by a polymeric matrix material 14. Bearing 10 may be used as an integral part of a ball and socket joint a tie rod end, as a thrust bearing, journal bearing, or in a variety of other rotating assemblies wherein load is imposed on bearing surface 12. Reinforcing fibers 16 and a plurality of glass beads 18 are embedded under the bearing surface 12 within the matrix material 14 to provide a novel composite bearing material 20. It should be noted that the glass beads and the reinforcing fibers are not shown to scale for illustration purpose.

The generally spherical components, i.e., the glass beads 18, not only contribute strength to the matrix material 14, but also provide an efficient means to disperse the load imposed on the bearing surface 12. Preferably, beads 18 are formed from a different material than that of a mating element such as a shaft or ball stud intended to contact surface 12. Thus, wear resulting from galling and fretting between the mating element and contact surface 12 is eliminated. The reinforcing fibers 16 have high strength and are pliable, adding tensile strength and lubricity to the matrix material of the bearing. The thermoplastic material 14 provides an ideal matrix for embedding the reinforcing fibers 16 and glass beads 18.

In the novel composite bearing material 20, the pliable high strength, non-abrasive aromatic polyimide fibers 16 and the dissimilar shaped spherical enforcement of glass beads 18 provide bearing 10 a self-fitting, or self-lapping quality. The initial wear, fitting or lapping of the bearing surface 12 actually improves the surface condition of the bearing, reducing subsequent wear. Further, the spherical elements of the beads help distribute loading on the bearing surface, reducing stress and extending bearing life. The pliable reinforcing fibers of aromatic polyimide also improve the embedability of the composite bearing material.

A suitable reinforcing fiber 16 used in the polymeric based composite bearing 10 is aromatic polyamide fibers, or aramid fibers. One of such fibers commercially available from Dupont Company is sold under the tradename of Kevlar®. Specific grades available are the Kevlar® 29, Kevlar® 49, and Kevlar® 149. Typical properties for Kevlar® 29 are $525 \times 10^3$ psi tensile strength, $12 \times 10^6$ psi tensile modulus, 4.4 percent elongation to break, and 1.44 g/cm³ density. Kevlar® 149 has the physical properties of 500×10³ psi tensile strength, 26×10⁶ psi tensile modulus, 1.9 percent elongation to break and 1.47 g/cm³ density. Other suitable reinforcing fibers include high strength and high purity glass fibers, boron fibers, carbon fibers, metallic fibers, etc. A suitable range of reinforcing fibers 16 to be used is between about 5 to about 35 weight percent of the total composite material, a preferred range is between about 5 to about 25 weight percent, and a more preferred range is between about 8 to about 17 weight percent of the total composite material 20. The specific fiber concentrations used in the novel polymeric based composite bearing are 5 weight percent, 8 weight percent, 10 weight percent, 17 weight percent, and 35 weight percent. It was discovered that the tensile strength of the bearing molded is directly related to the concentration of the reinforcing fibers 16. For instance, in regular load bearings, reinforcing fibers of 8 weight percent or lower may be adequate. For higher and severe load applications, reinforcing fibers of 17 weight percent or higher may be more desirable. The aramid fibers used have an average length of 1/16 inch (1.6 mm).

The reinforcing spheres 18 used in the novel polymeric based composite bearing are preferably solid glass spheres. These spheres have an average diameter of 50 micron. A typical commercially available glass bead material is supplied by the Potters Industry in a stock size of 3,000, having a U.S. sieve mesh size of minus 325 and a size of minus 0.0017 inch (45 microns). The glass spheres have a specific gravity of approximately between 2.45 to 2.50, a refractive index of 1.51 to 1.52, and a minimum roundness of approximately 70 percent. The glass spheres have a tensile modulus of approximately $10 \times 10^6$ psi, a compressive modulus of around $4.3 \times 10^6$ psi, and a hardness of approximately 6 Moh. A typical range of glass beads to be used is between about 5 to about 15 weight percent of the total composite material, a preferred range is between about 5 to about 12 weight percent, and a more preferred range is between about 5 to about 10 weight percent. Other reinforcing spheres may also be used in the present invention bearing. These include ceramic spheres that are made of boron nitride, silicon carbide, silicon nitride, etc. As noted above, however, beads 18 are preferably formed from a different material than that intended to mate with surface 12 of bearing 10 to eliminate wear resulting from galling and fretting.

The polymeric matrix material 14 used can be any high strength thermoplastic material. One such suitable material is polyamide or nylon 6,6. Nylon 6,6 can be commercially obtained from many different sources. The novel polymeric based composite material is first compounded into pellets and then injection or compression molded into bearings. Alternatively, the composite material may be extruded. Other suitable polymers that can also be used as the matrix material are polyacetal, polyphenylene sulfide, polyester, polyimide, etc.

EXAMPLE 1

In this example of a regular load bearing, 8 weight percent of aramid fibers, 8 weight percent of glass beads, and 84 weight percent of nylon 6,6 are used to mold a composite bearing. A bearing that has satisfactory service life is produced.

EXAMPLE 2

In this example, a high load bearing is injection molded of 17 weight percent aramid fibers, 8 weight percent glass beads, and 75 weight percent nylon 6,6 thermoplastic matrix material. A bearing that is suitable for use in heavy duty and severe loading applications is produced.

The present invention is also directed to a high strength, low friction composite material that is suitable for use in bearings and other mechanical components that require good frictional properties. The composite material consists of between about 5 to about 35 weight percent of high strength reinforcing fibers, between about 5 to about 15 weight percent of reinforcing spheres, and between about 50 to about 90 weight percent of a thermoplastic matrix material. The total weight percent of the composite material is 100. Suitable reinforcing fibers can be selected from the group of high strength/high purity glass fibers, boron fibers, carbon fibers, metallic fibers, etc. Suitable reinforcing spheres include glass spheres and ceramic spheres made of boron nitride, silicon carbide, silicon nitride, etc. The thermoplastic matrix material that can be used in the present invention may include polyamide, polyacetal, polyphenylene sulfide, polyester, polyimide, etc.

The present invention is also directed to a method of injection molding a bearing by injecting into a mold cavity a composite material as described above, at a temperature above its melting temperature by first heating the composite material before injection, and then demolding the bearing after the temperature of the bearing drops substantially below the melting temperature of the composite material. The processing conditions are those typically used in a conventional injection molding process for such composite materials. Compression molding may be desirable for limited production runs or with certain bearing assemblies. It is also possible to extrude the inventive composite bearing.

While the present invention has been described in an illustrative manner, it should be understood that the terminology used is intended to be in a nature of words of description rather than of limitation.

Furthermore, while the present invention has been described in terms of two preferred embodiments, it is to be appreciated that those skilled in the art will readily apply these teachings to other possible variations of the invention.

The embodiments of the invention in which an exclusive property or privilege is claimed are defined as follows.

It is claimed:

1. A homogeneous polymeric based composite bearing comprising:

between about 5 to about 35 weight percent of a high strength aromatic polyamide fiber;

between about 5 to about 15 weight percent of reinforcing spheres consisting of glass beads;

between about 50 to about 90 weight percent of a thermoplastic matrix material selected from the group consisting of polyamide, polyacetal, polyphenylene sulfide, polyester and polyimide, wherein the total weight percent of said composite bearing is 100; and said composite bearing lacking a metal enforcement for structural support.

2. The polymeric based composite bearing according to claim 1, wherein the weight percent for said aromatic polyamide fiber is between about 5 to about 25.

3. The polymeric based composite bearing according to claim 1, wherein the weight percent for said aromatic polyamide fiber is between about 8 to about 17.

4. The polymeric based composite bearing according to claim 1, wherein said bearing comprises about 8 weight percent of said aromatic polyamide fiber.

5. The polymeric based composite bearing according to claim 1, wherein said bearing comprises about 17 weight percent of said aromatic polyamide fiber.

* * * * *